United States Patent [19]

Schirmer

[11] Patent Number: 4,706,971
[45] Date of Patent: Nov. 17, 1987

[54] SEAL RING FOR PISTON RODS WITH PARTINGS

[76] Inventor: Alfred F. Schirmer, Im Tobel 7, CH-8706 Feldmeilen, Switzerland

[21] Appl. No.: 643,804

[22] Filed: Aug. 23, 1984

[30] Foreign Application Priority Data

Aug. 25, 1983 [CH] Switzerland ............... 4648/83

[51] Int. Cl.$^4$ ................. F16J 9/12; F16J 15/10
[52] U.S. Cl. ..................... 277/215; 277/157;
   277/165; 277/192; 277/216
[58] Field of Search ...... 277/217, 277/216, 196, 199, 206 R, 277/206 A, 134, 153, 157, 163, 164, 165, 192, 197, 208, 214–216

[56] References Cited

U.S. PATENT DOCUMENTS

| | | | |
|---|---|---|---|
| 1,331,522 | 2/1920 | Parsons et al. | 277/157 |
| 1,809,056 | 6/1931 | Mellor | 277/157 |
| 2,850,311 | 9/1958 | Mansfield | 277/192 |
| 2,877,071 | 3/1959 | Arnot | 277/216 X |
| 3,035,842 | 5/1962 | Gilbert | 277/157 X |
| 3,076,659 | 2/1963 | Kremer | 277/157 X |
| 3,563,557 | 2/1971 | Doutt | 277/206 R |
| 4,185,842 | 1/1980 | Magara | 277/216 X |
| 4,206,930 | 6/1980 | Thrane et al. | 277/165 |
| 4,337,954 | 7/1982 | Backlin et al. | 277/208 X |
| 4,350,349 | 9/1982 | McTavish | 277/199 |
| 4,371,174 | 2/1983 | Gurtler | 277/217 |

FOREIGN PATENT DOCUMENTS

| | | | |
|---|---|---|---|
| 893587 | 2/1972 | Canada | 277/134 |
| 1049256 | 8/1953 | France | 277/165 |
| 1193072 | 4/1959 | France | 277/215 |
| 58-85344 | 5/1983 | Japan | 277/214 |
| 28100 | 10/1932 | Netherlands | 277/215 |
| 2978 | of 1874 | United Kingdom | 277/217 |
| 136610 | of 1920 | United Kingdom | 277/217 |
| 928119 | 5/1982 | U.S.S.R. | 277/216 |

*Primary Examiner*—Robert S. Ward
*Attorney, Agent, or Firm*—Toren, McGeady & Associates

[57] ABSTRACT

For sealing-off a piston rod moistened with lubricating oil, for example of a 2-stroke diesel engine, several seal rings, some of which only act as wiper rings and some of which also act as seal rings for a gas-tight seal, depending on their design, are arranged next to one another in a packing casing. Each seal ring has less than three partings and consists of sectorial ring pieces made from a plastic material. On the outside, the seal ring is surrounded by a helical spring which runs around annularly and which pushes the ring sections against the piston rod by its tensile force. The ring sections are made of a plastic material, as used, for example, also in this manner for slide bearings, so that the so-called anti-seizure properties of the seal ring are significant.

16 Claims, 10 Drawing Figures

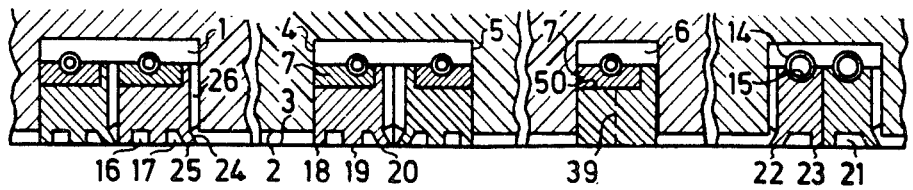
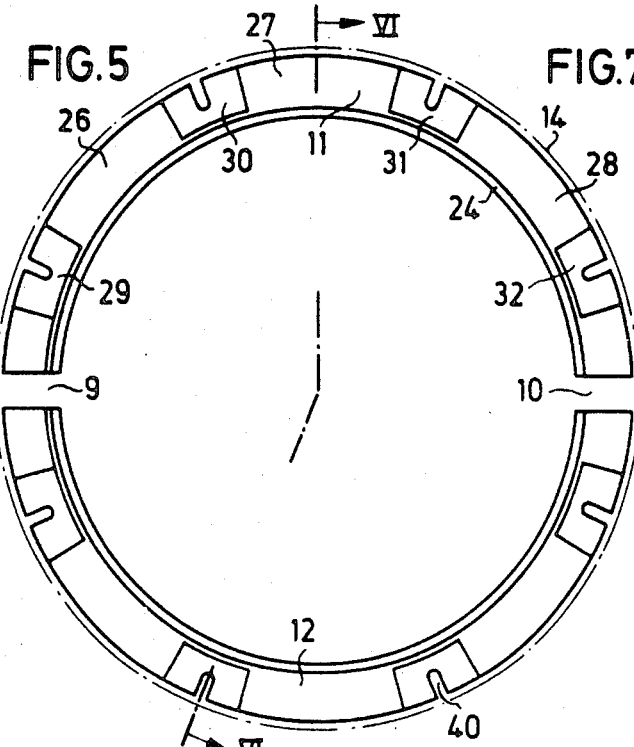
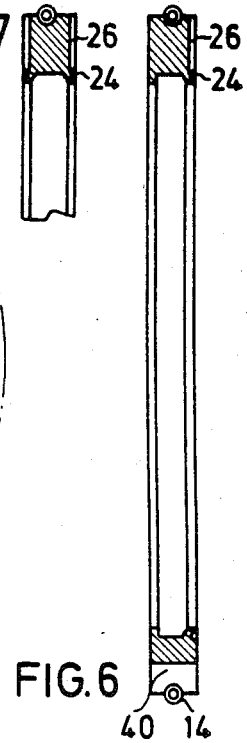
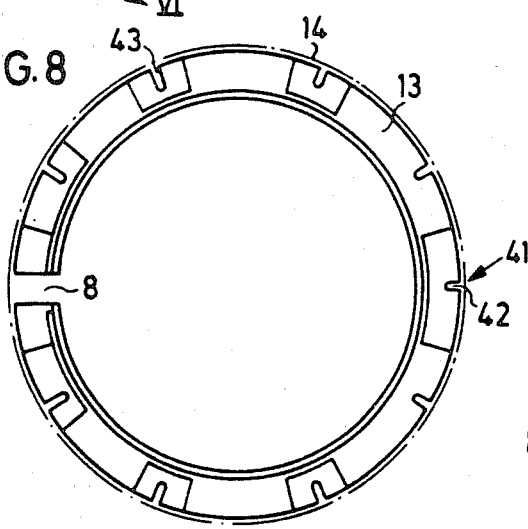
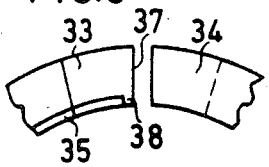
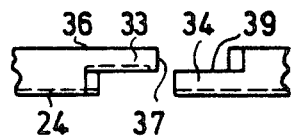

SEAL RING FOR PISTON RODS WITH PARTINGS

The invention relates to a seal ring for piston rods where the seal ring has flat side surfaces extending perpendicular to its axis for floating contact with side walls of a casing chamber or with the side surface of a second seal ring. At least one outer spring element is attached to and extends around the full circumference of the seal ring for providing resilient contact pressure against the piston rod. The seal ring is made of plastic material and has less than three partings.

For sealing-off a piston rod moistened with lubricating oil, for example of a 2-stroke diesel engine, several seal rings, some of which only act as wiper rings and some of which also act as seal rings for a gas-tight seal, depending on their design, are arranged next to one another in a packing casing. A seal ring of this type is known, for example, from German Utility Model No. 7 129 925. It has three partings and thus consists of three sectorial ring pieces. On the outside, the seal ring is surrounded by a helical spring which runs around annularly and which pushes the three ring sections against the piston rod by its tensile force. The ring sections are made of a metal alloy, as used, for example, also in this manner for slide bearings, since the reciprocating movement of the piston rod does not allow any continuous lubricant film to develop, so that the so-called anti-seizure properties of the seal ring are significant. To avoid excessive oil loss through the seal rings in the run-in phase, it is necessary to fabricate the ring sections with high precision by fine machining. Nonetheless, during the run-in phase, considerable oil loss occurs, which with a piston rod diameter of 200 mm can amount to approx 1–3 l/hour. Stronger contact pressure of the ring sections against the piston rod by means of a stronger spring does indeed reduce oil loss, but also results in higher frictional resistance of the piston rod and faster wear of the ring sections.

The three-piece design of the known seal ring with partings between the arc-shaped ring sections is intended to enable a continuous readjustment of these ring sections to be carried out corresponding to the wear constantly advancing with service life. This construction principle with ring sections made of rigid, ie. metallic, material and designed as wear parts, therefore demands ring sections which only extend by a limited arc length around the circumference of the piston rod which is significantly less than 180°, as the use of, for example, semi-circular ring sections would result in wear being restricted to the middle region of the ring section since the outer springs running around press both ring sections against each other and there is therefore no contact pressure of the two end regions of each ring section against the piston rod. The design of the known seal ring with three ring sections arranged next to one another in the circumference direction indeed has the advantage in comparison with a single-piece, closed seal ring that, even after a relatively long service life and corresponding wear, under the pressure of the spring it is still in close contact with the piston rod and thus retains its oilwiping and/or sealing effect. However, a disadvantage is the greater outlay required for fabrication of the ring sections and for assembly of the ring, although it is advantageous that the seal ring, or its sections, do not have to be pushed onto the piston rod. A further disadvantage is that, due to the forces acting on them as a result of the movement of the piston rod, the arc-shaped ring sections are subjected to tilting forces about their longitudinal axis, which can result in edge contact with the piston rod.

The invention is based on the object of providing a seal ring of the type mentioned at the start which can be fabricated and assembled more easily, has increased resistance against tilting forces, is subjected to less wear and has no or no significant runin phase with improved sealing effect. This object is achieved by making the seal ring from a plastic material with less than three partings.

Surprisingly, it has been revealed that a nonelastomeric plastic having a compressive strength and dimensional stability suitable for seal rings of this generic type for the fabrication of the machine flat side surfaces nevertheless permits the fabrication of arc-shaped ring sections of customary or functionally adapted cross-sectional form, which have sufficient flexibility that, even with an arc shape of 180° and more, under the external pressure of the spring element, they mould themselves against the piston rod even in the case of geometrical inaccuracy of the piston rod crosssection or changes in diameter. This flexibility even makes it possible to produce the seal ring in one section, ie. just with one parting, without foregoing the possibility of assembly from outside the piston rod. By bending the seal ring, the parting can be opened far enough for it to be pushed over the piston rod. The spring element, which is to be assembled subsequently and is arranged outside the ring, reverses any permanent bending deformation arising during disassembly and results in an even contact between the seal ring and the surface of the piston rod.

The design of the seal ring with less than three partings, ie. consisting of only two or one section, has the further advantage that is, or its ring sections, has a greater resistance against tilting forces. The consequently more stable contact of the seal ring or the seal ring sections against the piston rod also enables a spring element of less resilience to be used, without the oilwiping or sealing effect deteriorating, so that the seal ring is subjected to less wear and the frictional resistance is reduced. Advantageous embodiments of the seal ring according to the invention are specified in the dependent claims.

There follows a description of the invention with reference to the exemplary embodiments shown in the drawing, in which:

FIGS. 1–4 show cross-sectional representation of various embodiments and fitting arrangements of seal rings, FIG. 5 shows a side view of a two-section seal ring, FIG. 6 shows a cross-section along the line VI—VI of FIG. 5, FIG. 7 shows an incomplete cross-sectional representation corresponding to FIG. 6 of a further embodiment, FIG. 8 shows a reduced side view of a one-piece seal ring, FIG. 9 shows a side view of a section of a seal ring in the region of its overlap and FIG. 10 shows a plan view of the ring region according to FIG. 9.

FIGS. 1, 2 and 4 show seal rings fitted in pairs in a cut-out 1, running around annularly, of a machine casing section 2. The cut-outs have side walls 4, 5 running perpendicular to the piston rod 3, against which walls flat side surfaces of the seal rings are in contact.

FIG. 3 shows a single seal ring in a casing cutout 6 adapted to its width. The casing cut-outs 1 and 6 are joined, in a way not shown, by oil return channels, so that the oil wiped off from the piston rod 2 can be returned.

FIGS. 1 to 3 show the gas-tight configuration of seal rings constituted by the fact that, in a way known per se, they have an outer chamber ring 7 which seals the parting 8 or the partings 9, 10 of the seal ring radially from the outside. Although the chamber ring 7 likewise has a parting for the required adjustability of the diameter of the seal ring, it is arranged circumferentially offset to partings 8, 9, 10.

The seal rings of the fitting example according to FIG. 4 have no outer or chamber ring and thus act as so-called oil wiper rings, in that they only seal off in the axial direction.

The arrangement of the seal rings in pairs in accordance with fitting examples of FIGS. 1, 2 and 4 has the purpose of sealing the parting 8 or the partings 9, 10 in the axial direction by the rings of a pair being fitted mutually offset circumferentially so that their partings cannot overlap. This offset position can be secured by means of pin connections (not shown).

Each seal ring of the seal ring pairs according to FIGS. 1, 2 and 4 and the seal ring according to FIG. 3 has either two arc-shaped ring sections 11, 12, which are separated from each other by means of two partings 9, 10, or just one ring section 13 having one parting 8, which are held together and pressed against the piston rod 3 by means of a helical spring 14 which runs around annularly. An outer groove 25 of the seal ring or the seal ring sections, which is adapted to the cross-section of the spring, is intended for receiving the spring 14. The tensile force of the pretensioned spring 14 results in an inwardly directed pressure, evenly distributed radially over the circumference of the seal ring, which, due to the flexibility of the seal ring or the seal ring sections, also results in an even distribution of the contact pressure of the sealing surfaces of the seal ring against the surface of the piston rod 3.

The seal rings illustrated in FIGS. 1 and 2 are provided with two grooves 16, 17 running around in parallel to each other on the side of the ring facing the piston rod 3, so that the seal ring has strip-shaped sealing surfaces 18, 19, 20 running around it. The grooves 16, 17 and the strip-shaped sealing surfaces 18, 19, 20 result in a significant reduction in the force acting radially outwards on the seal ring and opposing the pressure of the spring 14 in comparison with a sealing surface extending over the entire width of the seal ring. This force is produced by the hydrodynamic oil pressure in the sealing gap caused by the movement of the piston rod. The seal rings according to FIG. 4 have only one groove 21 and, correspondingly, two strip-shaped sealing surfaces 22, 23. Thus, the contact force of the spring which is required for adequate sealing-off can be reduced, so that there is also a reduction in the wear.

A further step towards possible reduction in the force of the spring 14 consists in the provision of an undercut 24 at, or in the vicinity of, an edge 25 of the seal strip limiting a sealing surface 20, 22. The oil wiped off the surface of the piston rod 3 and brought along by the movement of the piston rod accumulates at this undercut. The dynamic pressure results in a pressure component at the undercut 24 which is directed radially inwards and counters a tilting of the seal strip about its cross-sectionsl axis. However, this is only possible by virtue of the fact that spaces 26, 27, 28 are also provided radially, adjoining the undercut on the outside and only interrupted by the flat side surfaces 29 to 32 required for the lateral support of the seal strips.

In the exemplary embodiment according to FIG. 5, each semi-circular ring section 11 has three arc-shaped spaces 26, 27, 28, limited by the side surfaces 29 to 32. It goes without saying, however, that, alternatively, numerous smaller spaces could also be provided, limited by correspondingly narrow side surfaces. Via these spaces, the oil wiped off can be channelled into the recesses 1, 6, without a pressure pushing the seal strip radially outwards developing in them. In the exemplary embodiment according to FIG. 7, undercuts 24 combined with spaces 26 are provided on both sides of the seal ring, as wiping-off of oil with corresponding dynamic pressure also occurs in the return movement of the piston rod 3. However, of greater significance is the arrangement of the undercut and spaces on the side of the seal ring facing the larger volume of oil adhering to the piston rod to be expected. In the case of a diesel engine, the undercut with spaces is therefore provided on the side facing the crankcase. FIGS. 1 and 3 show fitting examples of seal rings with single-sided arrangement of the undercut and spaces whereas FIGS. 2 and 4 are for cases where the seal rings are fitted so that the undercut and spaces are on sides facing different directions.

As is known per se, the partings of the seal rings are preferably designed as a lap joint, so that the overlapping of the joint sections 33, 34, with the seal rings in fitted position, in the axial direction does not cause a fissure to be made through which the oil could pass. The illustrations in FIGS. 5 and 8 to 10 show the ring before the joints have been overlapped, to make them clearer. As best shown by FIG. 9, the channel 35 as formed by the undercut 24 continues into joints 33, 34. On the ring end 36 which is offset on the side having the undercut 24 by the formation of the lap joint, an offset of the channel 35 is also produced. In order to prevent an oil leakage occurring in the circumferential direction along this channel 35, the latter ends at a distance from the end surface 37 of this ring end 36. There therefore remains at the end of the channel 35 a sealing surface 38 of the lap joint, which abuts the opposing sealing surface 39 of the lap joint correspondingly with the change in size of the seal ring.

Since, to perform its function properly, a plastic matErial suitable for the seal ring according to the invention must ensure good dimensional stability, and therefore has relatively high strength, which counters the desired bending deformability of the seal ring sections 11, 12 or of thE seal ring 13, the seal ring can, in a way not shown, be of flatter cross-section in comparison with known seal rings and/or have recesses 40 at several points around its circumference directed radially from the outside inwards, which recesess have the effect of a local reduction in cross-section. In this case, the recesses are preferably of various depths corresponding to the bending strain to be expected upon bending deformation. In the case of the one-piece seal ring according to FIG. 8, when it is bent open, the greatest bending strain occurs in the vertex region 41 of the ring arc, so that the recess 42 provided there is of smaller depth than the recess 43 lying nearer the parting 8. As FIG. 8 shows, the depth of the recesses increases from the vertex region 41 towards the parting 8.

For sealing-off the piston rod when varying gas pressures occur, as is the case with reciprocating compressors, in an advantageous embodiment of the invention, the chamber ring covering the parting or partings radially outwards is fitted into a lateral outer recess 50 in such a way that the parting or partings are covered only on a lateral part of their width extending in the direction of the piston rod. this produces a one-sided gas seal against a side wall 4 of the casing cut-out 6, so that when the gas pressure drops the gas to be sealed off can flow back on the side of the seal ring not radially sealed off. However; this not only produces an improved sealing effect, but also less wear of the seal ring, as it is not constantly being pushed radially inwards against the piston rod by the gas pressure in the casing cut-out. It goes without saying that this embodiment has the described effect only with respect to seal rings which have both of their side surfaces in contact, without interruption by spaces 26, with the side walls 4, 5 of the casing cut-out, as shown in FIG. 3.

Examples of suitable materials for a seal ring according to the invention are PTFE or polyimide containing a filler improving the sliding properties and/or temperature resistance, for example graphite.

Experiments with a seal packing using seal rings according to the invention have demonstrated a considerable reduction in oil losses due to the improved sealing effect, so that, in comparison, a. seal packing using known seal rings causes an oil loss several time higher, particularly in the run-in phase. In the arrangement, e.g. on a two-stroke diesel engine, the improved sealing effect can also greatly reduce the frequency of oil changes, as the ingress of contamination in the crankcase is also much reduced.

With the use of materials for both rings which slide against each other well, such as, for example, the above-mentioned materials, the arrangement of the outer ring or chamber ring between the inner seal ring and the outer spring element running all the way around results in a rapid and even adaptation of the resilience exerted on the sealing surfaces subjected to dynamic forces.

I claim:

1. A seal ring for piston rods, having flat side surfaces running perpendicular to its axis, for floating contact with a contiguous side surface, and having at least one outer spring element attached to it and extending around the entire circumference of the seal ring for its resilient contact pressure against the piston rod, wherein the seal ring is made of plastic material and has only one parting, a chamber ring (7) covering the parting (8) on the radially outside thereof, said chamber ring is narrower than the seal ring in the axial direction thereof and is arranged in a lateral recess of said seal ring cross-section, so that it covers the parting only on one side of the seal ring, said chamber ring having an outer side surface extending perpendicularly to the axis of the seal ring and extending in the same plane as one of said flat side surfaces of said inner seal ring whereby said outer side surface is arranged for floating contact with the contiguous side surface, and said seal ring having a lap joint with axially overlapping ends of said seal ring.

2. A seal ring for piston rods including an inner seal ring having flat side surfaces running perpendicular to its axis, for floating contact with a contiguous side surface, and said inner seal ring having at least one parting, said inner seal ring is surrounded by an outer ring covering the parting, wherein the outer ring is designed as an outer seal ring and is surrounded in the circumferential direction by at least one spring element, for the resilient contact pressure of the seal ring against the piston rod, said outer seal ring having an outer side surface extending perpendicularly to the axis of the seal ring and extending in the same plane as one of said flat side surfaces of the said inner seal ring whereby said outer side surface is arranged for floating contact with the contiguous side surface, and the outer seal ring is arranged in a lateral recess of the inner seal ring, so that it covers said at least one parting only on one side of the axial seal ring width.

3. A seal ring as claimed in claims 1 or 2, comprising three strip-shaped sealing surfaces (18, 19, 20; 22, 23) running around parallel to each other, provided for the contact with the piston rod.

4. A seal ring as claimed in claim 3, wherein, in the vicinity of at least one seal strip edge (25), limiting the sealing surface (20, 22), an undercut (24) which runs around is provided and spaces (26, 27, 28) adjoin this undercut radially outwards.

5. A seal ring as claimed in claim 4, wherein the undercut is located at one of the radially inside outer edges of the seal strip and the space adjoining the latter radially outwards is provided at the surface of the seal ring in the form of a number of arc-shaped recesses (26, 27, 28) distributed in the circumferential direction.

6. A seal ring as claimed in claims 1 or 2, wherein, in the vicinity of at least one seal strip edge (25), limiting a sealing surface (20, 22), an undercut (24) which runs around is provided and spaces (26, 27, 28) adjoin this undercut radially outwards.

7. A seal ring for piston rods, having flat side surfaces running perpendicular to its axis, for floating contact with a contiguous side surface, and having at least one outer spring element attached to it and extending around the entire circumference of the seal ring for its resilient contact pressure against the piston rod, wherein the seal ring is made of plastic material, in the vicinity of at least one seal strip edge (25), limiting a sealing surface (20,22), and undercut (24) which runs around is provided, and spaces (26, 27, 28) adjoin this undercut radially outwards, and said undercut is located at one of the radially inside outer edges of the seal strip and the spaces adjoining the latter radially outwards are provided at the side surface of the seal ring in the form of a number of arc-shaped recesses (26, 27, 28) distributed in the circumferential direction.

8. A seal ring as claimed in claim 7, wherein the recesses (26, 27, 28) are limited by side surface regions (29-32) of the seal strip, the width of which is smaller than the width of the recesses.

9. A seal ring as claimed in claim 3, comprising that said seal ring has only one parting, a chamber ring (7) covering the parting (8) on the outside, which ring is narrower than the seal ring and is arranged in a lateral recess of the seal ring cross-section, so that it covers the parting only on one side of the seal ring width.

10. A seal ring as claimed in claim 8, comprising a lap joint, the undercut running around continuing into the lap region and ending at a distance from an end surface (37) of the ring end (36).

11. A seal ring as claimed in claim 7, comprising a lap joint the undercut running around continuing in the overlap region and ending at a distance from an end surface (37) of the ring end (36).

12. A seal ring as claimed in claim 7, wherein the undercut is located at both of the radially inside outer edges of the seal strip and the spaces adjoining the latter radially outwards are provided at the side surfaces of the seal ring in the form of a number of arc-shaped recesses (26, 27, 28) distributed in the circumferential direction.

13. A seal ring as claimed in claim 12, wherein the recesses (26, 27, 28) are limited by side surface regions (29-32) of the seal strip, the width of which is smaller than the width of the recesses.

14. A seal ring as claimed in claim 4, wherein the undercut is located at both of the radially inside outer edges of the seal strip and the spaces adjoining the latter radially outwards are provided at the surfaces of the seal ring in the form of a number of arc-shaped recesses (26, 27, 28) distributed in the circumferential direction.

15. A seal ring as claimed in claim 3 comprising that said seal ring has two partings, a chamber ring (7) covering the partings (9, 10) on the outside, which ring is narrower than the seal ring and is arranged in the lateral recess of the seal ring cross-section, so that it covers the partings only on one side of the seal ring width.

16. A seal ring for piston rods, having flat side surfaces running perpendicular to its axis, for floating contact with a contiguous side surface, and having at lesat one outer spring element attached to it and extending around the entire circumference of the seal ring for its resilient contact pressure against the piston rod, wherein the seal ring is made of plastic material, in the vicinity of at least one seal strip edge (25), limiting a ceiling surface (20, 22), and undercut (24) which runs around is provided, spaces (26, 27, 28) adjoin this undercut radially outwards, and a lap joint, the undercut running around continuing into an overlap region and ending at a distance from an end surface (37) of the ring end (36).

* * * * *